United States Patent
Repoulias

(10) Patent No.: US 10,336,402 B2
(45) Date of Patent: Jul. 2, 2019

(54) METHOD AND DEVICE FOR OPERATING AN ELECTRIC BICYCLE

(71) Applicant: Conti Temic microelectronic GmbH, Nürnberg (DE)

(72) Inventor: Filoktimon Repoulias, Nürnberg (DE)

(73) Assignee: CPT Zwei GmbH, Nuremberg (DE)

( * ) Notice: Subject to any disclaimer, the term of this patent is extended or adjusted under 35 U.S.C. 154(b) by 261 days.

(21) Appl. No.: 15/311,046

(22) PCT Filed: May 12, 2015

(86) PCT No.: PCT/EP2015/060417
§ 371 (c)(1),
(2) Date: Jan. 30, 2017

(87) PCT Pub. No.: WO2015/173212
PCT Pub. Date: Nov. 19, 2015

(65) Prior Publication Data
US 2017/0151997 A1 Jun. 1, 2017

(30) Foreign Application Priority Data
May 16, 2014 (DE) .................. 10 2014 209 350

(51) Int. Cl.
*B60L 15/20* (2006.01)
*B62M 25/08* (2006.01)
(Continued)

(52) U.S. Cl.
CPC .......... *B62M 6/45* (2013.01); *B60L 15/2045* (2013.01); *B60L 15/2054* (2013.01); *B60L 50/20* (2019.02);
(Continued)

(58) Field of Classification Search
CPC ................ B60L 11/007; B60L 15/2045; B60L 15/2054; B60L 2200/12; B60L 2240/423;
(Continued)

(56) References Cited

U.S. PATENT DOCUMENTS 6,296,072 B1 * 10/2001 Turner ..................... B62M 6/45
180/206.2
2002/0014366 A1   2/2002 Turner
(Continued)

FOREIGN PATENT DOCUMENTS

DE   102013206163 A1   10/2014
JP   H0733070 A        2/1995
(Continued)

OTHER PUBLICATIONS

German Office Action dated Mar. 9, 2015 for corresponding German Patent Application No. 10 2014 209 350.3.
International Search Report and Written Opinion dated Aug. 26, 2015 from corresponding International Patent Application No. PCT/EP2015/060417.

*Primary Examiner* — Jerrah Edwards

(57) ABSTRACT

A method and device for operating an electric bicycle that has an electric motor and a transmission with at least two gears is provided. The method includes ascertaining a current pedal frequency that is generated by a user of the electric bicycle and checking whether the ascertained current pedal frequency lies within a specified pedal frequency interval. The method also includes ascertaining a current travel speed of the electric bicycle, ascertaining at least two transmission gears within the specified pedal frequency interval depending on the ascertained travel speed, and ascertaining a respective output of the electric motor for each of the ascertained at least two gears. The method also includes ascertaining the lowest ascertained output of the electric motor by comparing the two ascertained outputs of
(Continued)

the electric motor, and ascertaining the transmission gear for which the lowest output was ascertained.

18 Claims, 6 Drawing Sheets

(51) Int. Cl.
  *B62M 6/45* (2010.01)
  *B60L 50/20* (2019.01)
  *B62M 25/00* (2006.01)

(52) U.S. Cl.
  CPC .......... *B62M 25/08* (2013.01); *B60L 2200/12* (2013.01); *B60L 2240/423* (2013.01); *B60L 2240/486* (2013.01); *B62M 2025/003* (2013.01); *Y02T 10/645* (2013.01); *Y02T 10/72* (2013.01); *Y02T 10/7283* (2013.01)

(58) Field of Classification Search
  CPC ....... B60L 2240/486; B62M 2025/003; B62M 25/08; B62M 6/45; Y02T 10/645; Y02T 10/72; Y02T 10/76; Y02T 10/7283
  See application file for complete search history.

(56) References Cited

U.S. PATENT DOCUMENTS

2011/0267178 A1  11/2011  Nishihara et al.
2017/0158286 A1*  6/2017  Briers ..................... B62M 9/14

FOREIGN PATENT DOCUMENTS

| JP | H09240568 A | 9/1997 |
| JP | H10250674 A | 9/1998 |
| TW | 201240875 A | 10/2012 |

* cited by examiner

METHOD AND DEVICE FOR OPERATING AN ELECTRIC BICYCLE

TECHNICAL FIELD

The present disclosure relates to a method and a device for operating an electric bicycle having an electric motor and a transmission having at least two gears.

BACKGROUND

Electric bicycles having pedal support are generally two-, three- or four-wheeled vehicles equipped with pedal cranks and an electric motor as electric drive unit. These electric bicycles, also called pedelecs, cannot be driven exclusively by the electric drive unit, but rather also always need a certain drive power that a cyclist has to apply by means of the pedal cranks. The electric drive unit is accordingly a support motor and drives the electric bicycle only if the cyclist also contributes his/her part thereto.

Shift decisions of an automatic shift mechanism for bicycles or for systems which read out a speed of the vehicle and display corresponding shifting up or shifting down on a display—where the shifting up or down would be accomplished manually—are typically based almost exclusively on the vehicle speed and the pedal frequency of the cyclist in order to keep the latter in the range of a "comfort" value for the cyclist. From the view point of the cyclist, however, significantly higher demands are placed on electric bicycles. Since an electric bicycle is generally equipped with an electronic subsystem having, inter alia, a motor, power electronics and one or more batteries, the cyclist expects not only traveling comfort with regard to a preferred pedal frequency, but also for example a long lifetime of the electrical system with regard to a possible maximization of range with the available battery power.

Automatic shift mechanisms have been designed hitherto in such a way that they take a gear selection decision and perform shifting independently and disregarding a possible installation and an electronic assistance system of the bicycle. With regard to manual shifting the problem barely differs since a cyclist generally takes his/her shift decision independently of the electrical energy consumption.

SUMMARY

Therefore, it is desirable to have a method and a device suitable for operating an electric bicycle with high traveling comfort and a low electrical energy consumption.

A first aspect of the disclosure provides a method for operating an electric bicycle having an electric motor and a transmission having at least two gears. The method includes ascertaining an instantaneous pedal frequency, which is generated by a user of the electric bicycle. The method also includes checking whether the ascertained instantaneous pedal frequency lies within a predetermined pedal frequency interval and ascertaining an instantaneous travel speed of the electric bicycle. The method also includes ascertaining at least two gears of the transmission within the predetermined pedal frequency interval depending on the ascertained travel speed and ascertaining a respective power of the electric motor for each of the at least two gears ascertained. The method also includes ascertaining the lowest ascertained power of the electric motor by comparing the at least two ascertained powers of the electric motor and ascertaining that gear of the transmission for which the lower power was ascertained.

It should be noted that a gear of the transmission is understood to mean a discrete transmission ratio.

Implementations of the disclosure may include one or more of the following optional features. In some implementations, the method described takes account of and fulfils two requirements: providing traveling comfort for the cyclist and ensuring an optimum electrical energy consumption, in particular on account of a low energy consumption during a normal, substantially constant traveling mode (referred to as: cruising mode). In this case, firstly an instantaneous pedal frequency of a user of the electric bicycle is ascertained. This is followed by checking whether the ascertained instantaneous pedal frequency lies within a predetermined pedal frequency interval. In this case, the predetermined pedal frequency interval can be preset or be predefined as needed by a user and thus be adapted to the user's need. A travel speed of the electric bicycle is ascertained depending on the instantaneous pedal frequency. This is followed by ascertaining at least two gears of the transmission within the predetermined pedal frequency interval depending on the ascertained travel speed. Afterward, a respective power consumption of the electric motor is ascertained for the at least two gears, where, finally, that gear is ascertained for which a lower power was ascertained. Consequently, the method is used to ascertain that gear or that transmission ratio which represents the lowest power consumption for the electric motor depending on an instantaneous pedal frequency or instantaneous travel speed. Moreover, the method is distinguished by the fact that minor requirements are made of the ascertainment or calculation, in particular the calculation during traveling with the electric bicycle, since the calculations or ascertainments are usually effected on the basis of fast interpolations of one-dimensional or two-dimensional matrixes, simple interval selections and simple algebraic calculations.

In some implementations, the method further includes ascertaining a respective motor torque of the electric motor for each of the at least two gears ascertained. The method further includes ascertaining a respective motor angular velocity of the electric motor for each of the at least two gears ascertained, and ascertaining the powers of the electric motor depending on the corresponding ascertained motor torques and depending on the corresponding ascertained motor angular velocities. Consequently, the powers of the electric motor for the at least two gears are additionally ascertained depending on a motor torque of each gear and respectively depending on a respective motor angular velocity of a respective gear. Consequently, the power of the electric motor for the corresponding ascertained gear can be ascertained in a simple manner and particularly accurately.

In some examples, the method includes ascertaining a respective efficiency of the electric motor for each of the ascertained two gears depending on the corresponding ascertained motor torque and depending on the corresponding ascertained motor angular velocity. The method further includes ascertaining the powers of the electric motor depending on the efficiencies, depending on the corresponding ascertained motor torques and depending on the corresponding ascertained motor angular velocities. The powers of the electric motor are thus additionally ascertained depending on efficiencies of the motor for the respective ascertained gears.

In some examples, the efficiencies are ascertained on the basis of a consumption characteristic map of the electric motor. In such a consumption characteristic map, efficiencies are represented depending on a motor torque and a motor angular velocity, that is to say a motor rotational speed. This results in so-called iso-efficiency contours. For each combination of a motor torque and the corresponding motor angular velocity it is thus possible to ascertain an efficiency of the electric motor, on the basis of which an energy consumption of the electric motor can be deduced.

In some implementations, after ascertaining the motor torques and motor angular velocities, a classification of the ascertained motor torques and of the ascertained motor angular velocities is carried out. The classification involves classifying the ascertained motor torques and/or the ascertained motor angular velocities according to predefined limit torques and/or limit angular velocities of the electric motor. In this case, it is possible for example to establish whether permissible limit torques and/or limit angular velocities of the electric motor are exceeded and reliable operation of the electric motor is thus ensured.

In some examples, the method includes outputting a signal, where the signal includes information about the ascertained gear for which the lower power was ascertained. In this case, outputting the signal may include outputting an audio signal, outputting a video signal and/or outputting a control signal for a display device. By way of example, the ascertained gear may thus be signaled acoustically or visually to a user of the electric bicycle, where it is left to the user's discretion to perform the shift process of the transmission.

In some implementations, the method furthermore includes the fact that an actuator for automatically shifting the transmission is driven depending on the ascertained gear that is assigned to the lowest ascertained power. It is thus possible, depending on the ascertained gear, automatically to shift the transmission of the electric motor.

In some examples, the actuator for automatically shifting the transmission is driven only after a predefined time period after ascertaining that gear of the transmission for which the lower power was ascertained. Analogously thereto, it is also possible for the outputting of the signal to be carried out only after the predefined time period. The predefined time period serves as a dead time, such that possible fluctuations in the pedal frequency of the cyclist and thus the travel speed do not lead to possibly frequent shifting back and forth in the case of an automatic transmission or to frequent ascertaining of different gears. In this case, the time period may be chosen for example so as to ensure that the user does not alter, or only slightly alters, the speed of the electric bicycle over a certain time period.

In another aspect of the disclosure, a device for operating an electric bicycle is described, the device being designed to carry out a method according to the first aspect.

The device substantially enables the abovementioned advantages and functions.

DESCRIPTION OF DRAWINGS

Further configurations of the disclosure are described in the following detailed description of with the aid of the appended figures. In the figures.

Like reference symbols in the various drawings indicate like elements.

DETAILED DESCRIPTION

Figure 1:
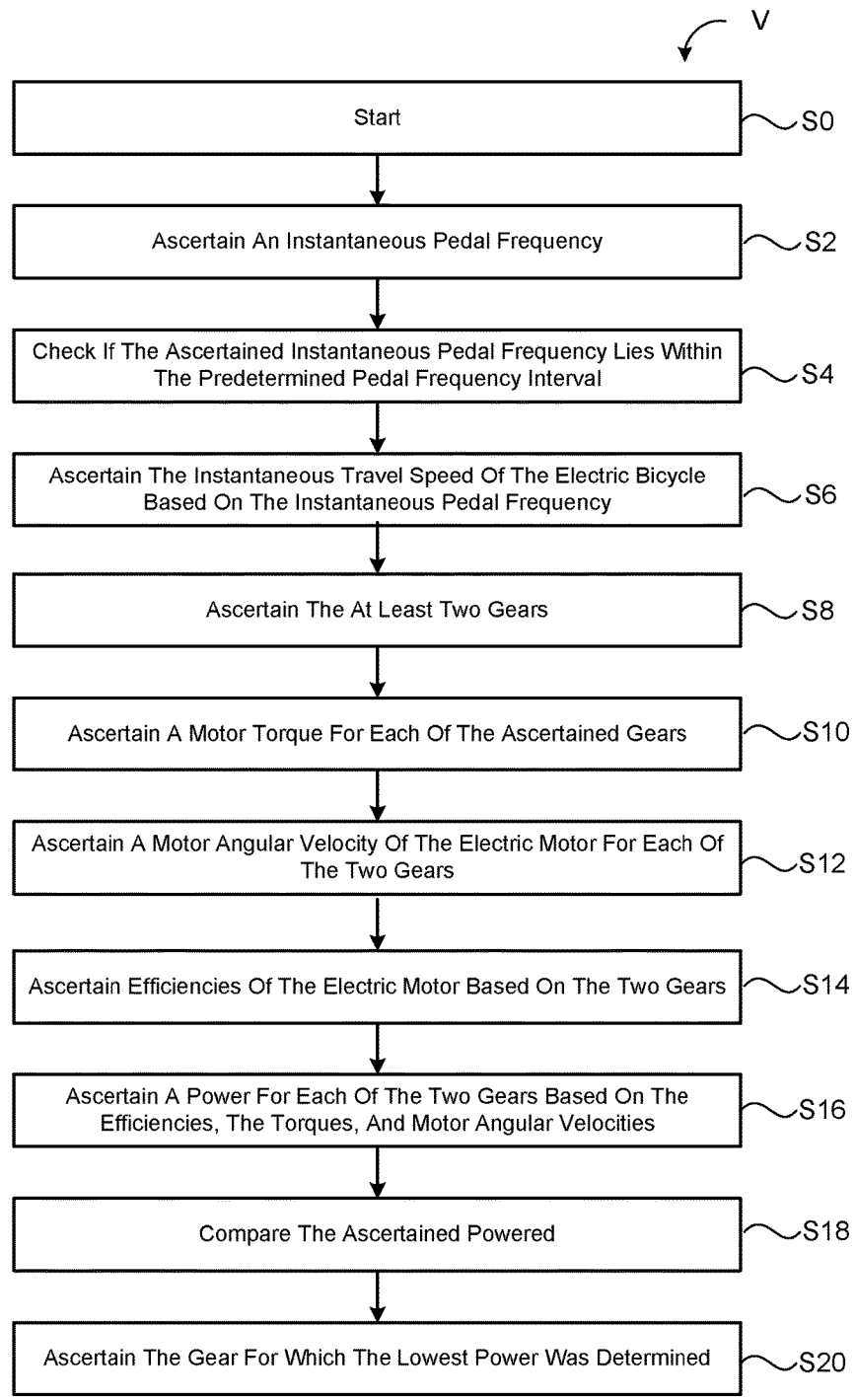
FIG. 1 shows a flow diagram of a method for operating an electric bicycle.

FIG. 1 illustrates a flow diagram for a method V for operating an electric bicycle. The method V is performed for example in a device for operating the electric bicycle, the device including at least one electric drive unit with a control unit and an electric motor. The electric bicycle further includes a transmission, which may be provided at the rear wheel. The control unit has for example a data and program memory and a computing unit and is coupled in terms of signaling to an electric drive unit of the electric bicycle, in particular to the electric motor. Furthermore, the control unit is coupled for example to one or more sensors of the electric bicycle in order for example to detect angular velocities of the bicycle, forces, moments and/or further measurement values in terms of signaling. The control unit furthermore includes a microcontroller having permanent memory and main memory (RAM).

Before the method V is explained in detail with reference to the flow diagram shown in FIG. 1, calculations necessary for the method V will be explained. These calculations may also be designated as offline calculation components of the method V and may be predefined at the factory. Alternatively, they can be manipulated by a user. These calculations can be carried out for example before a start of the electric bicycle.

Figure 2:
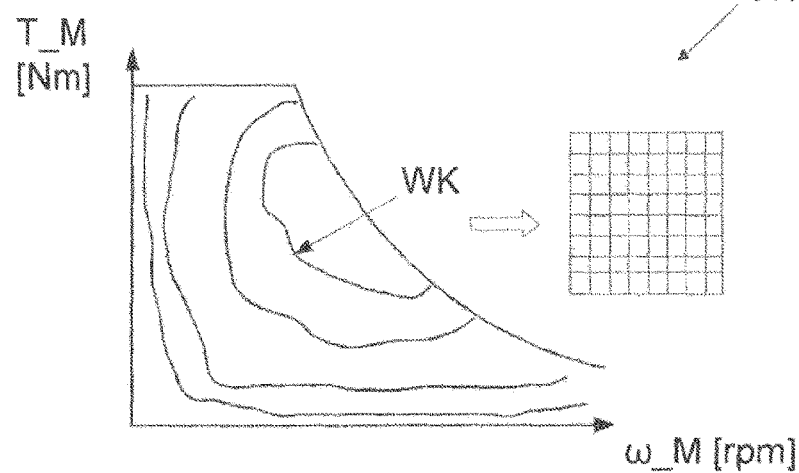
FIG. 2 shows a schematic illustration of a consumption characteristic map and a grid matrix stored in a microcontroller.

FIG. 2 illustrates a diagram illustration of a consumption characteristic map VK of the electric motor of the electric bicycle. The diagram illustrates a motor torque T_M relative to a motor angular velocity ω_M. Furthermore, iso-efficiency contours WK of efficiencies of the electric motor are illustrated in the diagram. As can be seen on the right next to the arrow illustrated, the corresponding diagram values are discretized in a grid matrix and stored in the permanent memory of the microcontroller of the control unit. In this case, the consumption characteristic map VK can be loaded into the main memory of the microcontroller during the sequence of the method V. On the basis of the consumption characteristic map VK it is possible, as explained later, to ascertain efficiencies on the basis of a torque and an associated angular velocity of the electric motor, which efficiencies provide a statement about an energy consumption of the electric motor.

A further offline calculation component is the derivation of a kinematic relationship between an instantaneous pedal frequency ω_C of a cyclist and an instantaneous speed v_PED_o of the electric bicycle. The kinematic relationship is specified depending on a gear G_VT_i of the transmission of the electric motor in equation G1 below.

In this case, the suffix "i" denotes a corresponding gear of the transmission. It should be noted that the variable designations used in the continuous text have underscores, while a subscript or superscript notation, in some instances with commas, is used for the variables in the formulae. As long as the same symbols are used, the same variables are involved.

$$v_{PED,o} = \frac{\omega_C}{G_{CH} G_{VT,i}} r_{R,W} \quad (G1)$$

It shall be repeated at this point that a gear is understood to mean a discrete transmission ratio of the transmission. In equation G1 here r_R_W corresponds to a radius of the rear wheel, the axle of which is coupled to the transmission. G_CH corresponds to a constant chain transmission ratio and G_VT_i corresponds to a corresponding transmission ratio of a specific gear i of the transmission of the electric bicycle.

Figure 3:
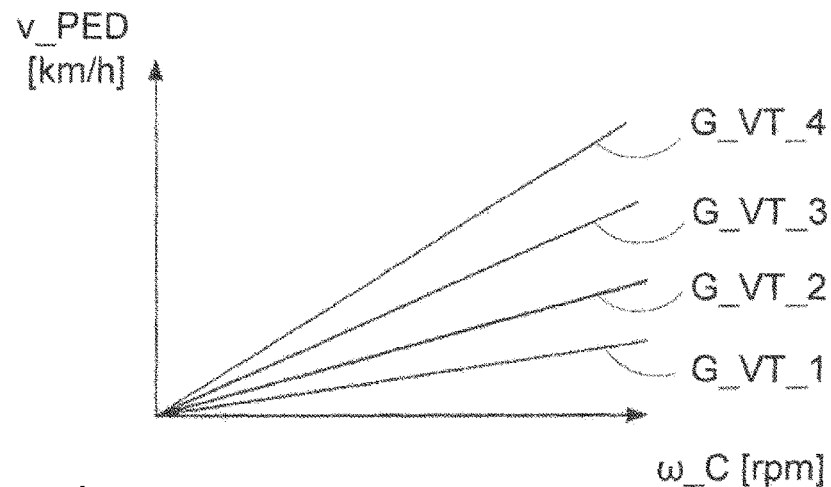
FIG. 3 shows a first schematic diagram illustration of a speed of the electric bicycle relative to a pedal frequency.

Based on the above equation it is possible to derive the diagram shown in FIG. 3, in which a vehicle speed v_PED is plotted relative to the pedal frequency ω_C of the cyclist. Corresponding gear straight lines for four gears G_VT_1 to G_VT_4 are additionally illustrated. The gear straight lines have a common starting point at the origin of the diagram. Based on this diagram it is thus possible to establish a direction relationship between the pedal frequency ω_C and the corresponding engaged gear G_VT_i of the transmission. It should be noted that for a specific speed v_PED, a specific pedal frequency ω_C depending on a gear G_VT_i it is only possible for points to lie on the gear straight lines and not outside the latter.

Figure 4:
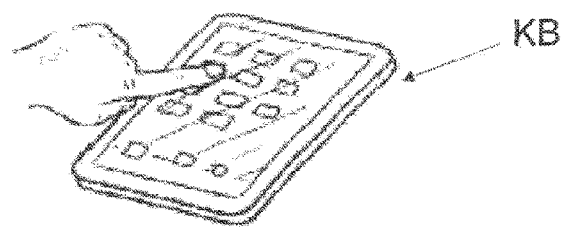
FIG. 4 shows a schematic, perspective illustration of an input unit.

Finally, a predetermined pedal frequency interval Δω_PREF is assumed for the method V. The pedal frequency interval Δω_PREF can for example be predefined at the factory or else defined by a user of the electric bicycle before or during the method V. This can be done by means of a keyboard KB, for example, as illustrated in FIG. 4. Alternatively, the pedal frequency interval Δω_PREF can also be defined by means of a touch screen or some other input possibility for the electric bicycle. The predetermined pedal frequency interval Δω_PREF is for example 60 to 80 rounds per minute (for short: rpm). The predetermined pedal frequency interval Δω_PREF can be, for example, that interval in which the user of the electric bicycle feels well and experiences a desired traveling comfort. The predetermined pedal frequency interval Δω_PREF is defined by a maximum and minimum frequency value, as specified below in equation G2:

$$\Delta\omega_{PREF} = [\omega_{PREF,min}, \omega_{PREF,max}] \quad (G2):$$

If the pedal frequency interval Δω_PREF is then inserted into equation G1 above, then a speed interval Δv_PED_i depending on each gear G_VT_i is obtained, as specified below in equation G3:

$$\Delta v_{PED,i} = \frac{\Delta\omega_{PREF}}{G_{CH} G_{VT,i}} r_{R,W} \quad (G3)$$

Figure 5:
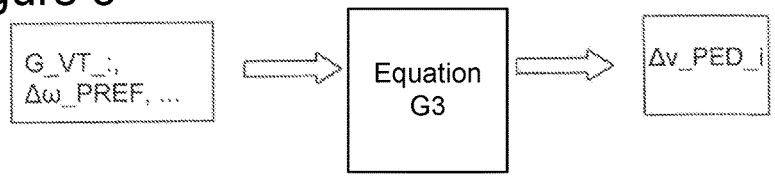
FIG. 5 shows a schematic illustration of ascertaining a speed interval.

This is also shown in the schematic illustration in accordance with FIG. 5.

Figure 6:
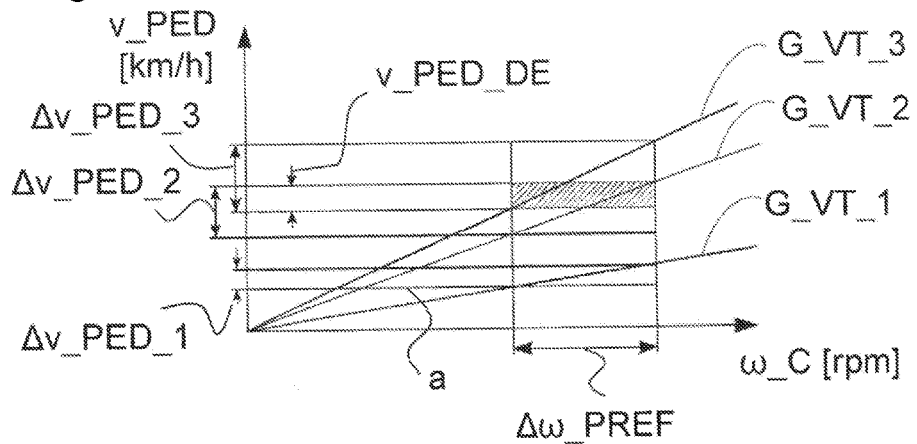
FIG. 6 shows a second schematic diagram illustration of a vehicle speed of the electric bicycle relative to a pedal frequency.

Proceeding from equation G3 and the speed intervals Δv_PED_i that can thus be ascertained for each gear G_VT_i, the diagram illustration in accordance with FIG. 6 is obtained, which basically corresponds to the diagram illustration from FIG. 3, the predetermined pedal frequency interval Δω_PREF additionally being illustrated by vertical lines. Furthermore, only three gears G_VT_i or gear straight lines are illustrated, for reasons of clarity. With the aid of horizontal lines, corresponding speed intervals Δv_PED_1, Δv_PED_2 and Δv_PED_3 are specified for each gear G_VT_1, G_VT_2 and G_VT_3.

On the basis of FIG. 6 it can be established that the speed interval Δv_PED_1 corresponds to the gear G_VT_1 and the projection of the preferred pedal frequency interval Δω_PREF. Consequently, exclusively the gear G_VT_1 corresponds to a speed of the electric bicycle which is in the speed interval Δv_PED_1. The same correspondingly applies to the gears G_VT_2 and G_VT_3 to which the corresponding speed intervals Δv_PED_2 and Δv_PED_3 correspond. In this case, it is evident from FIG. 6 that the latter two speed intervals Δv_PED_2 and Δv_PED_3 overlap. This overlapping speed interval is referenced by the reference sign v_PED_DE and illustrated in a hatched manner in FIG. 6. If a speed value that lies in the overlapping interval v_PED_DE is thus ascertained, there are two possibilities for a corresponding gear selection for which the instantaneous pedal frequency Δω_C of the cyclist lies within the preferred pedal frequency interval Δω_PREF.

The ascertained intervals and the corresponding gears G_VT_i or transmission ratios are likewise stored in the permanent memory of the microcontroller and are loaded into the main memory of the microcontroller upon the call-up of the method V, for example upon a start of the electric drive unit of the electric bicycle.

Ascertaining an optimum gear G_VT_i for the electric bicycle will now be described below with the aid of the flow diagram of the method V as illustrated in FIG. 1.

In a step S0, the method V is started and, if appropriate, variables are initialized. The method V is started for example near-simultaneously with a start of the electric drive unit of the electric bicycle.

In a step S2, an instantaneous pedal frequency ω_C is ascertained. One or a plurality of sensors of the electric bicycle are used for this purpose.

A further step S4 involves checking whether the ascertained instantaneous pedal frequency ω_C lies within the predetermined pedal frequency interval Δω_PREF.

In order that the method V functions, the instantaneous pedal frequency ω_C must lie within the predetermined pedal frequency interval Δω_PREF. In addition, the instantaneous speed of the electric bicycle V_PED_o has to exceed a minimum speed.

As long as the pedal frequency ω_C lies outside the preferred pedal frequency interval Δω_PREF, a simple algorithm can be applied for ascertaining a correct gear G_VT_i. The algorithm can be based for example on simple if-then rules. In addition, speed and/or pedal frequency measurements can be used for this purpose. In this case, the gears may be shifted such that the instantaneous pedal frequency ω_C falls within the predetermined pedal frequency interval Δω_PREF. In this case, it is assumed that the speed is increased by the cyclist himself/herself and lies within corresponding limits, such that the instantaneous pedal frequency ω_C can fall within the predetermined pedal frequency interval Δω_PREF. In this case, the lowest travel speed V_PED for which the method V is applicable is the intersection point between the lowest pedal frequency of the predetermined pedal frequency interval Δω_PREF and the gear straight line of the gear G_VT_1 (see FIG. 6). This is referenced by the straight line a.

Figure 7:
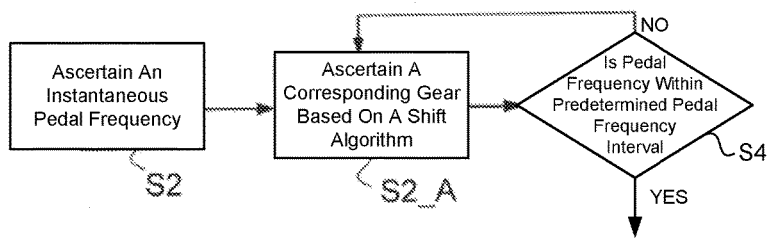
FIG. 7 shows a first schematic detail illustration of a step of the flow diagram.

Steps S2 and S4 are illustrated in detail once again in FIG. 7. In step S2, the instantaneous pedal frequency ω_C is ascertained, where a corresponding gear G_VT_i is ascertained in an intermediate step S2 A on the basis of a simple shift algorithm, as described above. Afterward, step S4 involves checking whether the instantaneous pedal frequency ω_C lies within the predetermined pedal frequency interval Δω_PREF. If the pedal frequency does not lie in the predetermined pedal frequency interval Δω_PREF, then step S2 A is repeated. It is assumed hereinafter that after step S4 a pedal frequency Δω_C is present which lies within the predetermined pedal frequency interval Δω_PREF.

Afterward, a next step S6 involves ascertaining the instantaneous travel speed v_PED_o of the electric bicycle depending on the instantaneous pedal frequency ω_C.

The instantaneous travel speed v_PED_o is ascertained for example by means of one or a plurality of sensors, for example torque or rotational speed sensors. Assuming that a sensor ascertains a speed value greater than the lowest possible, as described above, then the value lies within the interval Δv_PED_1. As a result, the gear G_VT_1 arises as the sole shift possibility or selection possibility for a gear in order that the pedal frequency of the cyclist after a possible shift operation still lies in the predetermined pedal frequency interval Δω_PREF.

However, this case is not the subject of the method V described and will not be considered any further.

Figure 8:
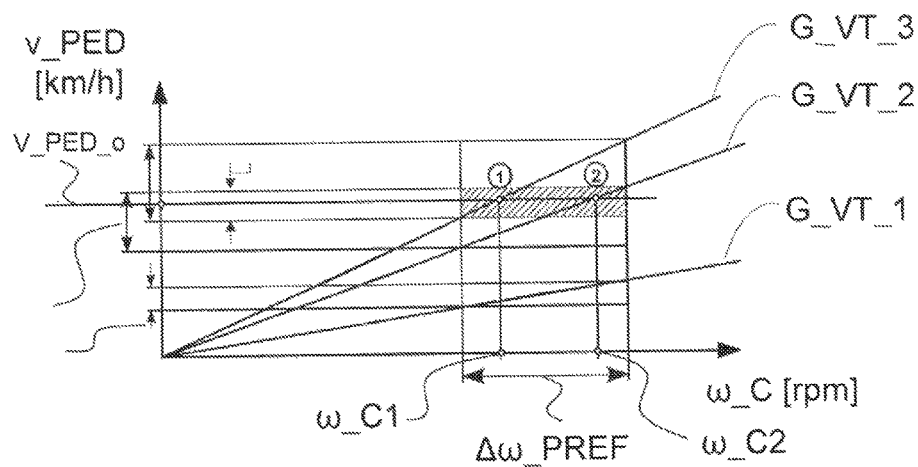
FIG. 8 shows a third schematic diagram illustration of a vehicle speed of the electric bicycle relative to a pedal frequency.
Figure 9:
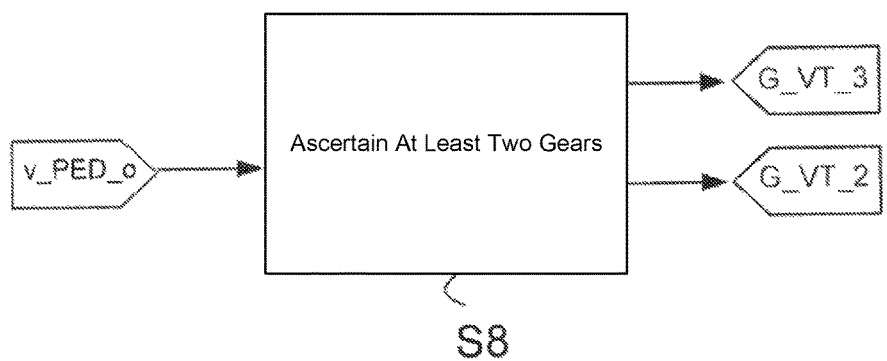
FIG. 9 shows a second schematic detail illustration of a step of the flow diagram.

If the instantaneous speed value V_PED_o falls within the overlapping interval v_PED_DE, then the gears G_VT_2 and G_VT_3 project this speed value by inverse projection into the predetermined pedal frequency interval Δω_PREF (also see FIG. 8 with reference signs 1 and 2). Consequently, both gears are possible candidates for the next shift operation. The ascertainment of the at least two gears G_VT_2 and G_VT_3 takes place in step S8 of the method V and is illustrated clearly again in FIG. 9. Each of the gears G_VT_2 and G_VT_3 is allocated a corresponding pedal frequency ω_C1 and ω_C2, respectively.

Depending on the step S8, that gear G_VT_2 or G_VT_3 for which the electric motor consumes less electrical energy is then selected in the subsequent steps of the method V.

It should be noted that for the majority of transmissions of electric bicycles and predetermined pedal frequency intervals Δω_PREF the overlapping speed interval v_PED_DE affects more than one gear or gear ratio in the travel mode, based on the configuration and dimensioning of the transmissions. At least two or three gears or gear ratios are customary here. By contrast, it is rather less frequently the case that only one gear is ascertained for a specific speed depending on the predetermined pedal frequency interval Δω_PREF. Therefore, for a large percentage of the time during which the electric bicycle is operated, considerable energy savings are acquired by means of the method V.

Figure 10:
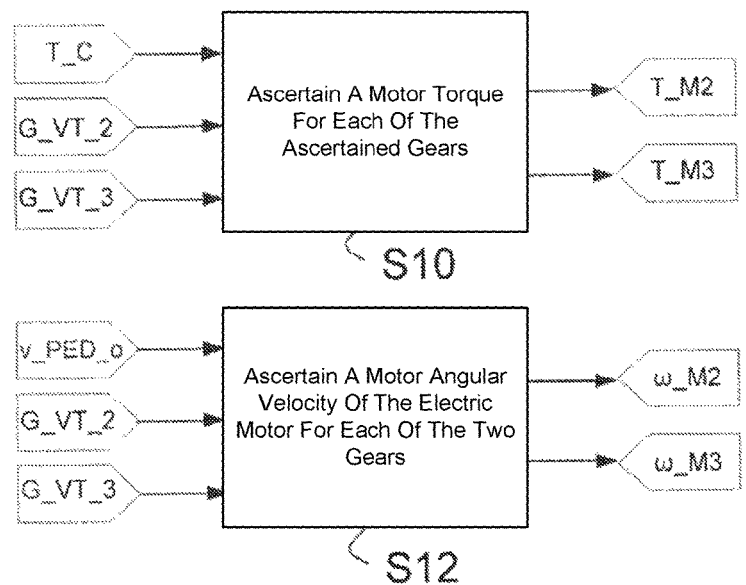
FIG. 10 shows a third schematic detail illustration of a step of the flow diagram.

A next step S10 involves ascertaining a motor torque T M2 and T M3 respectively for each of the ascertained gears G_VT_2 and G_VT_3. In addition, a step S12 involves ascertaining a motor angular velocity ω M2 and ω M3 of the electric motor for each of the two gears G_VT_2 and G_VT_3. This is also illustrated in a detail illustration in FIG. 10.

For this purpose, a torque analysis is to be performed, which is described below. While the cyclist is pedaling and experiences a torque support from the electric motor in the process, the bicycle moves at the specific instantaneous speed v_PED_o. In addition, for example, an air resistance acts on the bicycle and the cyclist and they experience moreover for example an acceleration or a deceleration due to inertial forces. Moreover, friction forces due to a road profile and shear forces act on the electric bicycle and the cyclist. For the bicycle to travel at the specific speed v_PED_o, load forces F_LOAD and traction forces F_TR must be equal, thus resulting in the following equation G4:

$$F_{LOAD} = F_{TR} = G_{VT} \frac{G_{CH}}{r_{R,W}} (T_C + \xi T_M \eta_{GH}) \eta_{VT} \eta_{CH} \quad (G4)$$

In this case, F_LOAD corresponds to the load forces, F_TR corresponds to the traction forces as a result of the cyclist and the torque support at the pedal as a result of the electric motor, T_C corresponds to the torque of the cyclist at the pedal shaft, T_M corresponds to the torque of the electric motor at the motor shaft, ξ corresponds to a constant transmission ratio between the electric motor and the pedal shaft, η_GB corresponds to an efficiency between the electric motor and the pedal, η_VT corresponds to an efficiency between the transmission and the rear wheel, and η_CH corresponds to an efficiency of the chain.

The support of the cyclist by the electric motor is described by the following equation G5:

$$\xi T_M \eta_{GB} = k_{ASSIST} t_C \quad (G5)$$

In this case, K_ASSIST corresponds to an assistance factor that indicates as a percentage how much, in percent, of the torque applied by the cyclist himself/herself is applied by the electric motor as additional torque.

Inserting equation G5 into equation G4 yields the following equation G6:

$$F_{LOAD} = G_{VT,o} \frac{G_{CH}}{r_{R,W}} [T_C (1 + k_{ASSIST})] \eta_{VT} \eta_{CH} \quad (G6)$$

In this case, G_VT_O corresponds to the instantaneous engaged gear. Assuming that the electric bicycle is in a normal, substantially constant travel mode in which no abrupt changes in the speed of the electric bicycle occur, then a change of gear brings about a change in the torque T_C applied by the cyclist himself/herself. In this case, the force F_LOAD remains the same. This leads to the following equation G7:

$$F_{LOAD} = G_{TV,i} \frac{G_{CH}}{r_{R,W}} [T_{C,i} (1 + k_{ASSIST})] \eta_{VT} \eta_{CH} \quad (G7)$$

G_VT_i and T_C_i correspond here to the new gear and, respectively, the new torque which is to be applied by the cyclist and which changes due to a gear shift.

From equations G6 and G7, using the previously ascertained two gears G_VT_2 and G_VT_3 for the instantaneous speed v_PED_O it is then possible to obtain the following equation G8:

$$T_{C,i} = T_C \frac{G_{TV,o}}{G_{TV,i}} \quad (G8)$$

In this case, the torque T_C is measured by means of a torque sensor; the current gear G_VT_O is likewise known. The current gear G_VT_O is either measured by means of a sensor or calculated indirectly by way of speed by means of pedal frequency measurements. G_VT_i is known after step S8 of the method V has been carried out. By means of equation G5, the following equation G9 is obtained:

$$T_{M,i} = \frac{k_{ASSIST} T_{C,i}}{\xi \eta_{GB}} \tag{G9}$$

With equation G9, it is thus possible to ascertain the required motor torque T_M_i for the corresponding ascertained gear G_VT_2 and G_VT_3 from step S8. The efficiency η_GB is additionally necessary for equation G9. This efficiency is dependent on changes with regard to the use of the bicycle, lubrication and other influences that cannot readily be ascertained analytically. Therefore, this factor is an estimated value. However, this estimated value does not influence the selection of the optimum gear with regard to an energy consumption of the electric motor, since the value of this factor is used in the equations for each gear. Moreover, an energy consumption comparison is made, such that estimated value errors of this estimated value are no longer included.

Step S12 involves ascertaining the motor velocity for each selected gear G_VT_2 and G_VT_3 depending on the current speed V_PED_o of the electric bicycle. Recourse is had here to equation 1 as mentioned initially. The following equation G10 thus results:

$$\omega_{M,i} = v_{PED,o} \frac{\xi G_{CH} G_{VT,i}}{r_{R,W}} \tag{G10}$$

Figure 11:
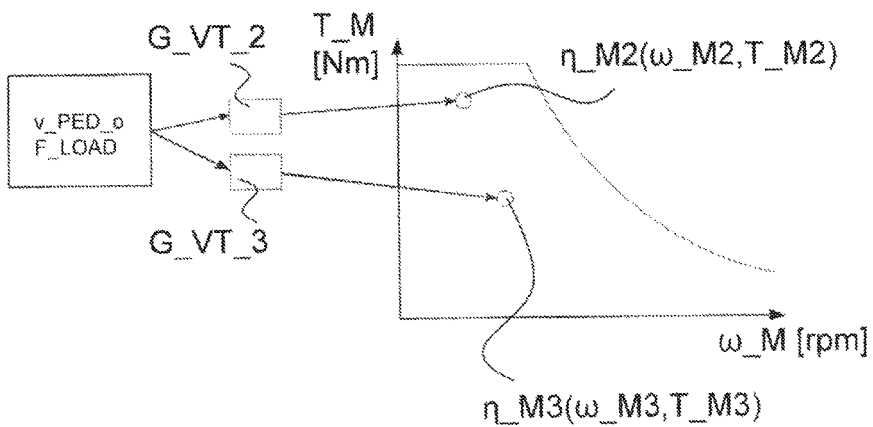
FIG. 11 shows a schematic illustration of ascertaining efficiencies of an electric motor of the electric bicycle.

Consequently, a full description of the operating points of the electric motor of the two ascertained gears G_VT_2 and G_VT_3 is obtained after steps S10 and S12 have been carried out. Operating point is understood to mean the motor rotational speed ω M2 and the associated motor torque T M2 and, respectively, ω M3 and T M3. This is illustrated schematically in FIG. 11, wherein FIG. 11 also shows that efficiencies η M2 and η M3 of the electric motor are ascertained on the basis of the ascertained gears G_VT_2 and G_VT_3, respectively. The efficiencies η_M2 and η_M3 are ascertained in a further step S14.

For this purpose, the initially mentioned consumption characteristic map VK of the electric motor is used, where corresponding efficiencies η_Mi are ascertained by corresponding interpolation.

Finally, in a step S16, a power P_M_i for each of the two ascertained gears G_VT_2 and G_VT_3 respectively is ascertained with the aid of the efficiencies η_M2 and η_M3, the torques T_M2 and T_M3 and motor angular velocities ω_M2 and ω_M3. In the example, the powers P_M2 and P_M3 are thus ascertained, as shown by the following equation G11:

$$P_{M,i} = \eta_{M,i} T_{M,i} \omega_{M,i} \tag{G11}:$$

In this case, once again the respective gear G_VT_i corresponds to the suffix "i".

In a further step S18, the ascertained powers P_M2 and P_M3 are compared with one another, where that power which has the lowest value is ascertained. Afterward, in a step S20, that gear G_VT_2 or G_VT_3 is ascertained for which the lowest power P_M2 or P_M3 was ascertained.

Figure 12:
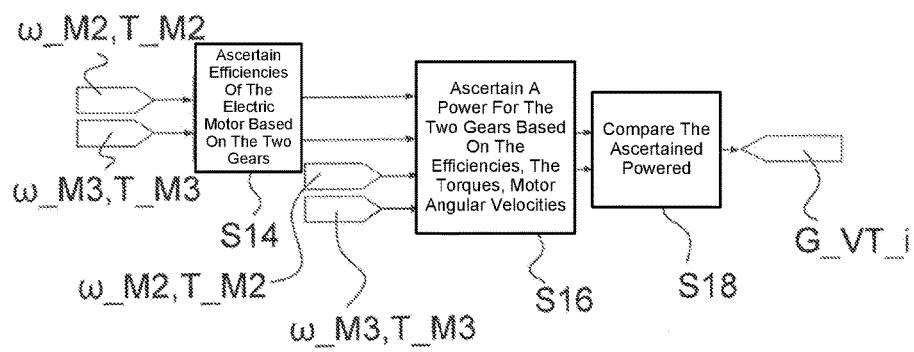
FIG. 12 shows a fourth schematic detail illustration of a step of the flow diagram.

This is also illustrated schematically with reference to FIG. 12.

The method V may furthermore include an optional step including outputting a signal, where the signal contains information about the ascertained gear for which the lower power was ascertained. By way of example, outputting the signal can include outputting an audio signal, a video signal and/or a control signal for a display device. In this regard, it is possible to indicate to a cyclist the optimum gear that is the most economical in terms of energy, the cyclist being intended to shift to the gear. In this case, however, the shift is left to the discretion of the cyclist himself/herself.

Alternatively, after step S20, a different, optional step can also be carried out, in which an actuator (SA) for automatically shifting the transmission of the electric bicycle is driven depending on the ascertained gear G_VT_2 or G_VT_3. Consequently, the electric bicycle can automatically perform transmission shifts and thus always ascertain the gear that is most economical in terms of energy at the predetermined pedal frequency Δω_PREF, independently of a user of the electric bicycle.

Figure 13:
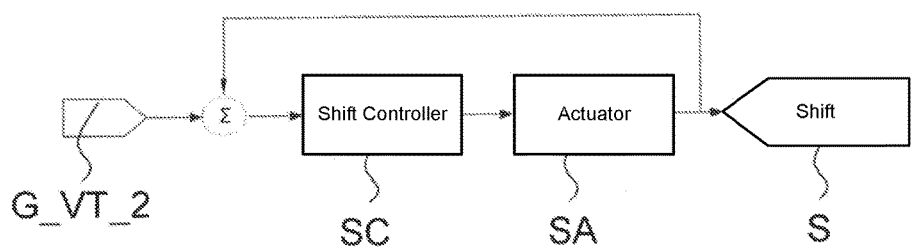
FIG. 13 shows a fifth schematic detail illustration of a step of the flow diagram.

This is illustrated by way of example in FIG. 13. It is assumed here that the gear G_VT_2 was ascertained. This gear G_VT_2 is communicated to a shift controller SC in terms of signaling. The controller in turn drives the actuator (SA) which carries out the shift S.

In addition, outputting the signal as described above or driving the actuator (SA) for automatic shifting can be performed after a predefined time period after ascertaining that gear having the lowest power. Such a time period may be expedient, for example, if the intention is to avoid frequent shifting back and forth or else the intention first is to check whether fluctuations in the travel speed occur.

In a further optional step, after ascertaining the motor torques T_M_i and motor angular velocities ω_M_i, a classification of the ascertained motor torques T_M_i and the ascertained motor angular velocities ω_M_i can be carried out, as described initially. This may serve for example to carry out safety monitoring that involves checking whether the electric motor is operated within predefined system limits. By way of example, it is thus possible to establish that a calculated motor torque cannot be applied by the electric motor.

The method V is thus shown as an intelligent and energy-optimized method which considers both requirements mentioned in the introduction: a traveling comfort of the cyclist and an optimum energy consumption on account of a low energy consumption during the use of the electric bicycle.

A number of implementations have been described. Nevertheless, it will be understood that various modifications may be made without departing from the spirit and scope of the disclosure. Accordingly, other implementations are within the scope of the following claims.

LIST OF REFERENCE SIGNS

F_LOAD Load force
F_TR Traction force
G_CH Chain transmission ratio
G_VT_i, G_VT_1, G_VT_2 Gear
G_VT_3, G_VT_4, G_VT_o
K_ASSIST Assistance factor
KB Keyboard
P_M_i, P_M2, PM3 Power of the electric motor
S0 to S20 Steps
S Shift
SA Actuator
SC Shift controller T_M_i, T_M2, T_M3 Motor torque
V Method
v_PED, v_PED_o Speed
v_PED_DE Overlapping speed interval
vall
Δv_PED_i, Δv_PED_1, Speed interval
Δv_PED_2, Δv_PED_3
VK Consumption characteristic map
WK Efficiency contours
η_GB, η_CH, η_VT Efficiencies
η Mi, η M2, η M3 Efficiency of the electric motor
ω_C, ω_C1, ω_C2 Pedal frequency
ω_M_i, ω_M2, ω_M3 Motor angular velocity
ω_PREF Predetermined pedal frequency interval

The invention claimed is:

1. A method for operating an electric bicycle having an electric motor and a transmission having at least two gears, the method comprising:
ascertaining, at a control unit in communication with the electric motor and the transmission, an instantaneous pedal frequency, which is generated by a user of the electric bicycle;
checking, by the control unit, whether the ascertained instantaneous pedal frequency within a predetermined pedal frequency interval;
ascertaining, at the control unit, an instantaneous travel speed of the electric bicycle based on torque data or rotational speed data received from a torque sensor or a rotational speed sensor respectively, the torque sensor and the rotational speed sensor in communication with the control unit;
ascertaining, at the control unit, at least two gears of the transmission within the predetermined pedal frequency interval depending on the ascertained travel speed;
ascertaining, at the control unit, a respective power of the electric motor for each of the at least two gears ascertained;
ascertaining, at the control unit, the lowest ascertained power of the electric motor by comparing the at least two ascertained powers of the electric motor;
ascertaining, at the control unit, the gear of the transmission associated with the lower power; and
outputting, from the control unit, a signal including information associated with the ascertained gear of the transmission associated with the lower power.

2. The method of claim 1, further comprising:
ascertaining a respective motor torque of the electric motor for each of the at least two gears ascertained;
ascertaining a respective motor angular velocity of the electric motor for each of the at least two gears ascertained; and
ascertaining the powers of the electric motor depending on the corresponding ascertained motor torques and depending on the corresponding ascertained motor angular velocities.

3. The method of claim 2, further comprising:
ascertaining a respective efficiency of the electric motor for each of the ascertained two gears depending on the corresponding ascertained motor torque and depending on the corresponding ascertained motor angular velocity; and
determining the powers of the electric motor depending on the efficiencies, depending on the corresponding ascertained motor torques and depending on the corresponding ascertained motor angular velocities.

4. The method of claim 3, wherein the efficiencies are ascertained on the basis of a consumption characteristic map of the electric motor.

5. The method of claim 2, wherein, after ascertaining the motor torques and motor angular velocities, a classification of the ascertained motor torques and of the ascertained motor angular velocities is carried out.

6. The method of claim 1, further comprising outputting a signal, wherein the signal contains information about the ascertained gear for which the lower power was ascertained.

7. The method of claim 6, wherein the signal comprises an audio signal, a video signal and/or a control signal for a display device.

8. A method for operating an electric bicycle having an electric motor and a transmission having at least two gears, the method comprising:
ascertaining, at a control unit, an instantaneous pedal frequency, which is generated by a user of the electric bicycle;
checking, by the control unit, whether the ascertained instantaneous pedal frequency within a predetermined pedal frequency interval;
ascertaining, at the control unit, an instantaneous travel speed of the electric bicycle based on torque data or rotational speed data received from a torque sensor or a rotational speed sensor respectively, the torque sensor and the rotational speed sensor in communication with the control unit;
ascertaining, at the control unit, at least two gears of the transmission within the predetermined pedal frequency interval depending on the ascertained travel speed;
ascertaining, at the control unit, a respective power of the electric motor for each of the at least two gears ascertained;
ascertaining, at the control unit, the lowest ascertained power of the electric motor by comparing the at least two ascertained powers of the electric motor;
ascertaining, at the control unit, the gear of the transmission associated with the lower power; and
outputting, from the control unit to an actuator configured to shift the transmission, a signal to automatically shifting the transmission based on the ascertained gear which is assigned to the lowest ascertained power.

9. The method of claim 8, wherein the actuator for automatically shifting the transmission is driven only after a predefined time period after ascertaining that gear of the transmission for which the lower power was ascertained.

10. A device for operating an electric bicycle, the device comprising:
a control unit comprising a data and program memory and a computing unit in communication with an electric motor, the control unit executing the following steps:
ascertaining an instantaneous pedal frequency, which is generated by a user of the electric bicycle;
checking whether the ascertained instantaneous pedal frequency lies within a predetermined pedal frequency interval;
ascertaining an instantaneous travel speed of the electric bicycle based on torque data or rotational speed data received from a torque sensor or a rotational speed sensor respectively, the torque sensor and the rotational speed sensor in communication with the control unit;
ascertaining at least two gears of a transmission within the predetermined pedal frequency interval depending on the ascertained travel speed;

ascertaining a respective power of the electric motor for each of the at least two gears ascertained;

ascertaining the lowest ascertained power of the electric motor by comparing the at least two ascertained powers of the electric motor; and ascertaining the gear of the transmission associated with the lower power; and outputting a signal including information associated with the ascertained gear of the transmission associated with the lower power.

11. The device of claim 10, wherein the control unit further executes the following steps:

ascertaining a respective motor torque of the electric motor for each of the at least two gears ascertained;

ascertaining a respective motor angular velocity of the electric motor for each of the at least two gears ascertained; and ascertaining the powers of the electric motor based on the corresponding ascertained motor torques and based on the corresponding ascertained motor angular velocities.

12. The system of claim 11, wherein the control unit further executes the following steps:

ascertaining a respective efficiency of the electric motor for each of the ascertained two gears depending on the corresponding ascertained motor torque and depending on the corresponding ascertained motor angular velocity; and determining the powers of the electric motor depending on the efficiencies, depending on the corresponding ascertained motor torques and depending on the corresponding ascertained motor angular velocities.

13. The system of claim 12, wherein the control unit ascertains the efficiencies based on a consumption characteristic map of the electric motor.

14. The system of claim 11, wherein, after ascertaining the motor torques and motor angular velocities, the control unit ascertains a classification of the ascertained motor torques and of the ascertained motor angular velocities.

15. The system of claim 10, wherein the signal includes information about the ascertained gear for which the lower power was ascertained.

16. The system of claim 15, wherein the signal includes an audio signal, a video signal and/or a control signal for a display device.

17. A device for operating an electric bicycle, the system comprising:

a control unit comprising a data and program memory and a computing unit in communication with an electric motor, the control unit executing the following steps:

ascertaining an instantaneous pedal frequency, which is generated by a user of the electric bicycle;

checking whether the ascertained instantaneous pedal frequency lies within a predetermined pedal frequency interval;

ascertaining an instantaneous travel speed of the electric bicycle based on torque data or rotational speed data received from a torque sensor or a rotational speed sensor respectively, the torque sensor and the rotational speed sensor in communication with the control unit;

ascertaining at least two gears of the transmission within the predetermined pedal frequency interval depending on the ascertained travel speed;

ascertaining a respective power of the electric motor for each of the at least two gears ascertained;

ascertaining the lowest ascertained power of the electric motor by comparing the at least two ascertained powers of the electric motor; and ascertaining the gear of the transmission associated with the lower power; and outputting, to an actuator configured to shift the transmission, a signal to automatically shift the transmission based on the ascertained gear which is assigned to the lowest ascertained power.

18. The device of claim 17, wherein the actuator for automatically shifting the transmission is shifted after a predefined time period after ascertaining the gear of the transmission for which the lower power was ascertained.

* * * * *